Patented Feb. 17, 1942

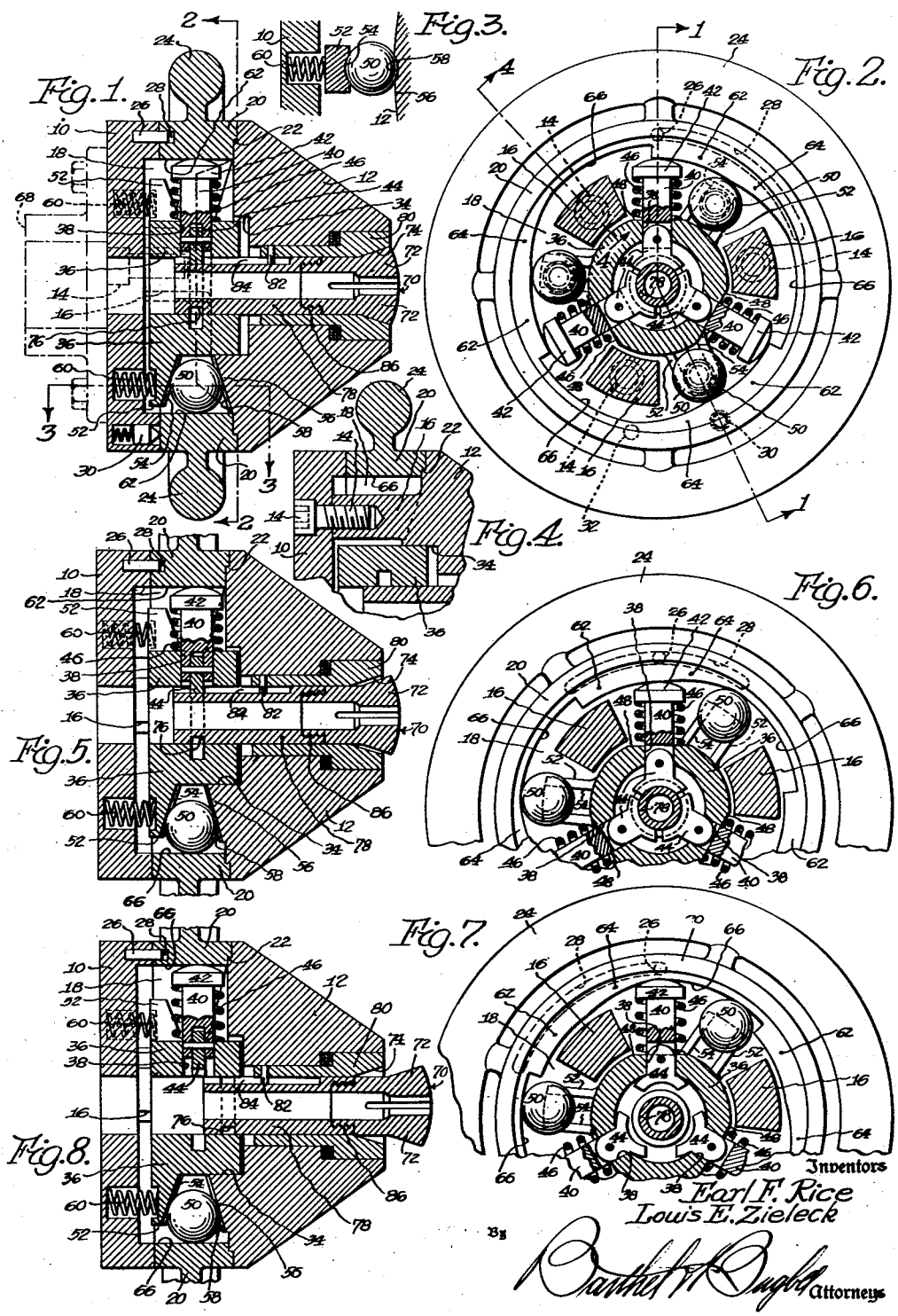

2,273,377

UNITED STATES PATENT OFFICE 2,273,377

MECHANICAL CHUCK

Earl F. Rice, Wyandotte, and Louis E. Zieleck, Allen Park, Mich.

Application March 19, 1941, Serial No. 382,548

11 Claims. (Cl. 279—51)

This invention relates, in general, to machine chucks and, in particular, to chucks of the mechanical type.

One of the objects of the present invention is to provide a new and improved mechanical chuck the collet of which is more easily and effectively operated than in chucks at present well known and in use.

Another object is to provide a new and improved mechanical chuck the construction and cost of which are simpler and lower, respectively, than heretofore.

Another object is to provide a new and improved mechanical chuck which is extremely compact and not apt to get out of order easily or otherwise require attention or repair.

Another object is to provide a mechanical chuck in which are embodied a new and improved clutch and a new and improved collet so designed, arranged and operable as to obviate substantially all the faults heretofore found with chucks of a similar character.

Other objects and advantages of the invention will become readily apparent from a reference to the following specification taken in conjunction with the accompanying drawing in which:

Figure 1 is a view taken along the lines 1—1 in Fig. 2 and showing the clutch and collet of the device in operative positions;

Fig. 2 is a view taken along the lines 2—2 in Fig. 1;

Fig. 3 is a view taken along the lines 3—3 in Fig. 1;

Fig. 4 is a view taken along the lines 4—4 in Fig. 2;

Figs. 5 and 6 are views similar to Figs. 1 and 2, respectively, but show the collet in inoperative position and the clutch in operative position; and Figs. 7 and 8 are views similar to Figs. 2 and 1, respectively, but show the clutch and collet in inoperative positions.

The chuck comprises, in part, a pair of end plates 10 and 12 which are annular for reasons soon to be understood and integrated, as shown particularly in Fig. 4, by means of a series of arcuately spaced fasteners 14 carried by said plate 10 and secured into a series of similarly spaced bosses 16 formed on said plate 12. Bosses 16 separate and provide a space 18 between plates 10 and 12 which is closed by an intermediate plate 20 also of annular design, the abutting faces of said plates 12 and 20 being complementarily shouldered, as at 22, for holding said plate 20 in place with respect to the axis of plate unit 10—12 and providing the sole means for intersupporting said unit and said intermediate plate. This shouldered and sole connection between plate unit 10—12 and plate 20 permits the latter to be moved relatively to the former about the chuck axis under force which may be applied manually to an annular handle portion 24 formed exteriorally on and about said plate 20, but, for reasons soon to be understood, the arc through which said plate 20 may travel is limited by the engagement of a pin 26, which is carried by plate 10, with either of the two ends of an arcuate slot 28 which is formed in said plate 20 and receives said pin. In addition to carrying pin 26, plate 10 also carries a spring-impressed detent 30 (see Fig. 1) which, when plate 20 has been turned so that the ends of its slot 28 are substantially equi-distant from said pin, (see Fig. 6), will enter a relatively shallow socket 32 (see Fig. 2) provided therefor in said plate 20 and audibly register such fact as well as provide a slight opposition to further turning of said last mentioned plate, the reason for which is soon to be discussed.

The inner face of plate 12 is centrally formed with a circular recess 34 which provides a bearing surface for an annular or ring-shaped supporting member 36, said member having an axial length substantially less than the axial distance between the inner face of plate 10 and the seat of said recess so that said member may be moved axially in said recess relatively to said plates (compare Fig. 1 with either Fig. 5 or Fig. 8). Member 36 is formed therethrough with a trio of radially extending bores 38 which are spaced substantially 120° from each other and centrally between the ends of said member, each of said bores slidably carrying a pin or plunger 40. The outer end of each plunger 40 resides in space 18 between plate 20 and member 36 and is preferably provided integrally with a curved head 42 while the inner end resides within its bore 38 and carries a preferably arcuately shaped jaw or finger 44. Fingers 44, being radially movable responsive to movement of plungers 40, are cooperable for providing an annular clutching device of variable diameter, the purpose for which is soon to be discussed. In order that this diameter be normally maintained at its greatest value, a series of coil springs 46 is employed, said springs being telescopically arranged about plungers 40 between heads 42 thereof and, if desired, flattened portions 48 formed on member 36 where the inner ends of said springs are contactable and having the effect of urging the plunger-finger units 40—44 radially outwardly.

As is to be noted in either of the Figs. 2, 6 or 7, the arcuate spacing between bosses 16, which are formed on plate 12 and receive fasteners 14 carried by plate 10, is similar to the arcuate spacing between plungers 40, which are carried by supporting member 36, but the relative positioning of said bosses and plungers is such that a trio of balls or spherical actuating members 50 may also be arranged within space 18 and have the same arcuate spacing therebetween as in the two instances hereabove, the result being that there is a uniform spacing between said bosses, plungers and actuating members, this being clearly shown in said Fig. 2. It is intended that the actuating members 50 be radially movable, as are the plungers 40, and, to provide for this, the end of supporting member 36 which is adjacent the inner face of plate 10 is integrally formed about its periphery with a trio of radially outwardly extending guide portions 52 which are spaced arcuately similarly as said members 50 and reside in contact therewith, the face of each of said portions 52 which is so in contact with its respective member 50 being angularly related to the vertical so that the outer end of said face is axially closer to said plate than is the inner end of said face, each of said faces being centrally formed with a radially extending groove 54 in which the respective member 50 is slidably received. Cooperating with the grooved faces 54 of guide portions 52 to complete the guiding of members 50 in their radial movement is a trio of protuberances 56 which are formed on the inner face of plate 12 radially outwardly of recess 34 and directly opposite said faces 54. The faces of protuberances 56 which are in contact with members 50 are angularly related to the vertical and each has an outer end which is axially spaced from the outer end of the respective face 54 a greater distance than the axial spacing between the inner ends of said first and second faces, this meaning that each cooperating pair of said faces on the member 36 and plate 12 provides a radially inwardly tapered wedge for the member 50 carried therewithin, said wedges being variable in mean diameter because of the movability of said member 36 relatively to said plate 12. The faces of protuberances 56 are radially grooved, as at 58, and these grooves cooperate with the grooves 54 to support and guide the members 50. Also, the inner wall of plate 10 carries a trio of springs 60 which are arcuately spaced similarly as guide portions 52 and reside directly opposite the latter and in abutment therewith, thereby urging member 36 away from said plate and normally minimizing the mean diameters of the aforementioned wedges.

The inner surface of intermediate plate 20, which plate, it is to be remembered, is movable about the chuck axis relatively to the plate unit 10—12 between the limits of the two ends of slot 28, is to serve as a camming or driving means for plungers 40 and balls 50, and, to this end, said surface is integrally formed with a trio of radially inwardly extending portions 62 having equal and constant radii of curvature and another trio of radially inwardly extending portions 64 having increasing radii of curvature. Each portion 62 has a camming surface the radius of curvature of which is such that, when one of the plungers 40 and one of the balls 50 are in contact with said surface, said plunger and ball are urged into their innermost positions, and each of said surfaces has an arcuate extent equal to the arcuate extent between the points of contact made by said plunger and ball with said surface. In other words, the three portions 62 are so positioned with respect to each other and to plungers 40 and balls 50 and are so radially inwardly and arcuately extensive that the three pairs of co-adjacent plungers and balls may be simultaneously urged into their innermost positions, which means that, when this occurs, the diameter of the clutch formed by the fingers or jaws 44 is at its minimum and the axial spacing between supporting member 36 and plate 10 is also at its minimum. On the other hand, the portions 64, which are merely extensions of the portions 62, flare radially outwardly along their lengths to merge into the normal inner surface of plate 20, the arcuate extent of said portions 64 being equal to that of said portions 62 so that, at certain times, the balls 50 may attain their outermost positions while the plungers 40 are still retained in their innermost positions. The portions of the inner surface of plate 20 into which cam portions 64 merge and from which cam portions 62 commence are indicated at 66 and have arcuate lengths equal to those of either of the other two sets of portions so that it is possible for plungers 40 and balls 50 to be, at other times, simultaneously disposed in their outermost positions.

In short, then, the 360° arc of the inner surface of plate 20 is made up of three cams 62, three cams 64 and three normal portions 66, and each of these nine elements has a 40° arcuate extent, an extent which is equal to that between the plunger and ball making up each immediately co-adjacent pair thereof. The 40° extent of each of the three portions 62 is such as to cause placement of all the plungers 40 and all the balls 50 into their innermost positions when plate 20 is in that position which is shown in Fig. 2; in other words, at this time, the finger or jaw clutch 44—44—44 will have its smallest diameter and the member 36 will be as close as is possible to plate 10. The 40° extent of each of the three portions 64 is such as to cause retention of all the plungers 40 in their innermost positions but to permit all the balls 50 to attain their outermost positions, such as when plate 20 is positioned as in Fig. 6; in other words, at this time, clutch 44—44—44 will still have its smallest diameter, but member 36 will have been positioned as far away from plate 10 as is possible. The 40° extent of each of the three portions 66 is such as to cause retention of all the balls 50 in their outermost positions and to permit all the plungers 40 to attain their outermost positions, such as when plate 20 is positioned as in Fig. 7; in other words, at this time, clutch 44—44—44 will have its greatest diameter and member 36 will still be as remotely positioned from plate 10 as it is in Fig. 6. It will be noted that pin 26 is at the left end of slot 28 when plate 20 is in the position of Fig. 2 and that, at this time, portions 62 are effective; when plate 20 has been moved counter-clockwise into the position of Fig. 6, pin 26 will be at the center of slot 28 and portions 64 will have become effective; and, when plate 20 has been moved still farther counter-clockwise into the position of Fig. 7, pin 26 will be at the right end of slot 28 and portions 66 will have become effective. It will further be noted in Fig. 2 that the arcuate spacing between socket 32 and detent 30 is equal to the arcuate extent of any one of the portions 62 and that this spacing is reduced to zero upon the arrival of plate 20 in its Fig. 6 position; in other words, when plate 20 reaches its Fig. 6 position, there will be an audible click and an opposition to further movement of plate 20, thereby informing the operator that his member 36 has been moved away from his plate 10 and that his clutch 44—44—44 is ready to increase in diameter if said plate 20 is moved further.

One of the uses to which the herein described device may be put is the supporting of rod or tube stock (not shown) carried by a lathe (not shown) having an annular face plate, shown in dotted lines at 68, the clutch 44—44—44 and the member 36 cooperating to axially move an elongated collet, shown generally at 70. In other words, collet 70 is hollow throughout its length and is formed, as is usual, with arcuately spaced fingers 72 which are outwardly flared on their exterior surfaces and cooperable with an annular, complementarily flared surface 74 formed in the end of plate 12. Obviously, when collet 70 is drawn inwardly with respect to plate 12, fingers 72 and surface 74 interengage and the result is that said fingers are sprung radially inwardly to decrease the collet bore diameter and thereby firmly grip the stock thereat. This inward drawing of collet 70 is effectuated by means of a connection between clutch fingers 44 and an annular slot 76 formed in the exterior surface of a shank portion 78 of said collet and the movement of member 36 toward plate 10.

Plate 12 preferably carries a hardened fitting 80 for receiving the collet 70 and it itself is internally formed with the finger contacting surface 74, said fitting carrying a key 82 for cooperation with an elongated keyway 84 formed in and along the exterior surface of collet shank 78 so that collet 70 and the stock gripped by the fingers 72 thereof may be unitarily rotated. If desired, shank 78 may be separable from the remainder of the collet 70 by means of a threaded connection 86 therebetween.

It will be noted that, when plungers 40 are in their outermost positions (see Fig. 7), fingers 44 are clear of slot 76 so that collet 70 may be drawn inwardly or outwardly relatively to the device.

Although the invention has been described with some detail it is to be understood that such description is for the purpose of illustration only and is not to be taken as being definitive of the limits of the inventive idea. The right is reserved to make such changes in the details of construction and arrangement of parts as will fall within the purview of the attached claims.

What we claim is:

1. In a device of the character described, a pair of members supported one for rotary movement and the other for axial movement, a third member connectible with said second mentioned member to move axially therewith, a second pair of members supported each for radial movement, means operable responsive to said rotary movement of said one member for effectuating said radial movement of said second pair of members, means operable responsive to said radial movement of one of said second pair of members for effectuating said connection of said third member with said second mentioned member, and means operable responsive to said radial movement of the other of said second pair of members for effectuating said axial movement of said connected second mentioned and third members.

2. In a device of the character described, a pair of members supported one for rotary movement and the other for axial movement, a third member connectible with said second mentioned member to move axially therewith, a second pair of members supported each for radial movement, means operable responsive to said rotary movement of said one member for effectuating said radial movement of said second pair of members, means operable responsive to said radial movement of one of said second pair of members for effectuating said connection of said third member with said second mentioned member, and means operable responsive to said radial movement of the other of said second pair of members after said effectuation of said connection for effectuating said axial movement of said connected second mentioned and third members.

3. In a device of the character described, a pair of members supported one for rotary movement between predetermined limit positions and the other for axial movement, a third member supported also for axial movement, a second pair of members supported each for radial movement between inner and outer limit positions, means operable responsive to the positioning of said one member in one of said positions therefor for effectuating the positioning of said second pair of members into said inner positions therefor, means operable responsive to the positioning of said one member in the other of said positions therefor for effectuating the positioning of said second pair of members into said outer positions therefor, means operable responsive to the positioning of said one member in a position intermediate said two positions therefor for effectuating the positioning of one of said second pair of members in its inner position and of the other of said second pair of members in its outer position, and means operable responsive to the positioning of said second pair of members into said inner, outer and mixed positions, successively and respectively, for effectuating, successively and respectively, the inter-locking and positioning of said second and third members at one end of their travel, the un-locking and positioning of said second and third members at the opposite end of their travel and the interlocking and positioning of said second and third members at said last mentioned end of said travel.

4. In a device of the character described, a pair of members supported one for rotary movement between predetermined limit positions and the other for axial movement, a third member supported also for axial movement, a second pair of members supported each for radial movement between inner and outer limit positions, means normally urging said second pair of members toward said outer positions, means operable responsive to the positioning of said one member in one of said positions therefor for effectuating the positioning of said second pair of members into said inner positions therefor in opposition to said first means, means operable responsive to the positioning of said one member in the other of said positions therefor and aided by said first means for effectuating the positioning of said second pair of members into said outer positions therefor, means operable responsive to the positioning of said one member in a position intermediate said two positions therefor for effectuating the positioning of one of said second pair of members in its inner position and of the other of said second pair of members in its outer position, and means operable responsive to the positioning of said second pair of members into said inner, outer and mixed positions, successively and respectively, for effectuating, successively and respectively, the inter-locking and positioning of said second and third members at one end of their travel, the un-locking and positioning of said second and third members at the opposite end of their travel and the inter-locking and positioning of said second and third members at said last mentioned end of said travel.

5. In a device of the character described, a hollow support having a portion rotatable relatively to the remainder, an elongated member carried by said support and movable axially relatively thereto between predetermined limit positions, said member having clamping elements movable toward each other upon movement of said member into one of said positions for decreasing the space therebetween and away from each other upon movement of said member into the other of said positions for increasing the space therebetween, a second support carried within said first support and bodily movable axially relatively thereto, means carried by said second support and operable responsive to movement of said portion for interconnecting said member and said second support for unitary movement, and means also carried by said second support and operable responsive to movement of said portion for effectuating said unitary movement.

6. In a device of the character described, a hollow support having a portion rotatable relatively to the remainder, said portion carrying cam means, an elongated member carried by said support and movable axially relatively thereto between predetermined limit positions, said member having clamping elements movable toward each other upon movement of said member into one of said positions for decreasing the space therebetween and away from each other upon movement of said member into the other of said positions for increasing the space therebetween, an annular support carried telescopically about said member within said first support and movable axially relatively to the latter, means carried by said annular support and controlled by said cam means for interconnecting said member and said annular support for unitary movement, and means also carried by said annular support and controlled by said cam means for effectuating said unitary movement.

7. In a device of the character described, a hollow support having a portion rotatable relatively to the remainder between limit positions, an elongated member carried by said support and movable axially relatively thereto between limit positions, said member having clamping elements movable toward each other responsive to movement of said member into one of said positions therefor for decreasing the space therebetween and away from each other responsive to movement of said member into the other of said positions therefor for increasing said space, a second support carried within said first support and movable axially relatively thereto between limit positions, means actuated by said portion at one of said positions therefor for inter-locking said member and said second support and at the other of said positions therefor for un-locking said member and said second support one from the other, and other means also actuated by said portion for unitarily moving said member and said second support between said limit positions therefor and during the inter-locked condition thereof.

8. In a device of the character described, a hollow casing having one portion movable rotatably relatively to the remainder and a second portion movable in opposite directions between limit positions axially relatively to the remainder but normally biased toward one thereof, an axially movable elongated member having clamping elements movable toward each other upon movement of said member in one direction and away from each other upon movement of said member in an opposite direction, radially movable members operable upon movement in one direction for inter-locking said first member and said second portion for unitary axial movement and upon movement in an opposite direction for un-locking said first member and said second portion for relative axial movement, other radially movable members operable upon movement in one direction for permitting movement of said second portion in one of said directions therefor toward said one limit position and upon movement in an opposite direction for moving said second portion in the other of said directions therefor toward the other of said limit positions, and means carried by said first portion for controlling said movements of said first and second sets of said radially movable members.

9. In a device of the character described, a hollow casing having one portion movable rotatably relatively to the remainder and a second portion movable in opposite directions between limit positions axially relatively to the remainder but normally biased toward one thereof, an axially movable elongated member having clamping elements movable toward each other upon movement of said member in one direction and away from each other upon movement of said member in an opposite direction, radially movable members operable upon movement in one direction for inter-locking said first member and said second portion for unitary axial movement and upon movement in an opposite direction for unlocking said first member and said second portion for relative axial movement, means for normally urging said radially movable members in said last mentioned direction, other radially movable members operable upon movement in one direction for permitting movement of said second portion in one of said directions therefor toward said one limit position and upon movement in an opposite direction for moving said second portion in the other of said directions therefor toward the other of said limit positions, and means carried by said first portion for controlling said movements of said first and second sets of said radially movable members.

10. In a device of the character described, a hollow casing having one portion movable rotatably relatively to the remainder and a second portion movable in opposite directions between limit positions axially relatively to the remainder, means normally biasing said second portion toward one of said positions, an axially movable elongated member having clamping elements movable toward each other upon movement of said member in one direction and away from each other upon movement of said member in an opposite direction, radially movable members operable upon movement in one direction for interlocking said first member and said second portion for unitary axial movement and upon movement in an opposite direction for un-locking said first member and said second portion for relative axial movement, other radially movable members urged in one direction by said biasing of said second portion and operable upon movement in an opposite direction for moving said second portion in the other of said directions therefor toward the other of said limit positions, and means carried by said first portion for controlling said movements of said first and second sets of said radially movable members.

11. In a device of the character described, a hollow casing having one portion movable rotatably relatively to the remainder and a second portion movable in opposite directions between limit positions axially relatively to the remainder, means normally biasing said second portion toward one of said positions, an axially movable elongated member having clamping elements movable toward each other upon movement of said member in one direction and away from each other upon movement of said member in an opposite direction, radially movable members operable upon movement in one direction for interlocking said first member and said second portion for unitary axial movement and upon movement in an opposite direction for un-locking said first member and said second portion for relative axial movement, means normally urging said radially movable members in said last mentioned directions, other radially movable members urged in one direction by said biasing of said second portion and operable upon movement in an opposite direction for moving said second portion in the other of said directions therefor toward the other of said limit positions, and means carried by said first portion for controlling said movements of said first and second sets of said radially movable members.

EARL F. RICE.
LOUIS E. ZIELECK.